(12) United States Patent
Michotte De Welle et al.

(10) Patent No.: US 9,447,991 B2
(45) Date of Patent: Sep. 20, 2016

(54) MOTORIZED ROTATIONAL DRIVE SYSTEM FOR A SOLAR COLLECTOR TRACKER SUPPORT SYSTEM

(75) Inventors: Yacin Michotte De Welle, Saint Martin de Crau (FR); Madyan Michotte De Welle, Saint Martin de Crau (FR)

(73) Assignee: PRESTIGE SOLAIRE, Meyreuil (FR)

( * ) Notice: Subject to any disclaimer, the term of this patent is extended or adjusted under 35 U.S.C. 154(b) by 220 days.

(21) Appl. No.: 14/122,368

(22) PCT Filed: May 30, 2012

(86) PCT No.: PCT/FR2012/051208
§ 371 (c)(1),
(2), (4) Date: Dec. 16, 2013

(87) PCT Pub. No.: WO2012/164222
PCT Pub. Date: Dec. 6, 2012

(65) Prior Publication Data
US 2014/0083249 A1  Mar. 27, 2014

(30) Foreign Application Priority Data

| May 30, 2011 | (FR) | ...................................... | 11 01659 |
| Dec. 20, 2011 | (FR) | ...................................... | 11 62002 |
| Apr. 26, 2012 | (FR) | ...................................... | 12 53883 |

(51) Int. Cl.
*F16H 19/00* (2006.01)
*F24J 2/54* (2006.01)
(Continued)

(52) U.S. Cl.
CPC ........... *F24J 2/5427* (2013.01); *F16H 19/001* (2013.01); *F24J 2/525* (2013.01); *F24J 2/5209* (2013.01);
(Continued)

(58) Field of Classification Search
CPC ...... F24J 2/5209; F24J 2/5232; F24J 2/5233; F24J 2/525; F24J 2/5269; F24J 2/542; F24J 2/5427; F24J 2/4638; F24J 2002/5462; F24J 2002/5465; F16H 19/001; H02S 20/00; Y02E 10/47; Y10T 74/1471
See application file for complete search history.

(56) References Cited

U.S. PATENT DOCUMENTS 3,153,789 A * 10/1964 Ashton .................... H01Q 3/08
14/29
4,209,231 A    6/1980 Sayre
(Continued)

FOREIGN PATENT DOCUMENTS

| CN | 201232734 Y | 5/2009 |
| DE | 19525994 A1 | 1/1997 |

(Continued)

OTHER PUBLICATIONS

International Search Report issued Oct. 24, 2012 re: PCT/FR2012/051199; citing: U.S. Pat. No. 4,209,231 A; WO 2009/147454 A2; WO 2010/054831 A2; DE 195 25 994 A1; US 2001/036024 A1; US 2010/180883 A1; CN 201 232 734 Y; WO 2010/089435 A1; DE 10 2006 027152 A1; US 2011/120523 A1.
(Continued)

*Primary Examiner* — Alfred Basichas
(74) *Attorney, Agent, or Firm* — Cantor Colburn LLP (57) ABSTRACT

Motorized rotational drive system (8) for rotating a framework about an axis of rotation, preferably a horizontal axis of rotation, for a solar collector tracker support system, said motorized system comprising: two ring gear sectors (80) extending in two planes orthogonal to the axis of rotation and provided with means of attachment to said framework; a transmission shaft (82) supporting two pinions (81) in mesh with the corresponding ring gear sectors (80) for synchronized rotation of said ring gear sectors (80); and a motorized drive means for driving the rotation of said transmission shaft (82).

8 Claims, 5 Drawing Sheets

(51) Int. Cl.
*F24J 2/52* (2006.01)
*H01L 31/042* (2014.01)
*F24J 2/46* (2006.01)

(52) U.S. Cl.
CPC ............. *F24J 2/5232* (2013.01); *F24J 2/5233* (2013.01); *F24J 2/5269* (2013.01); *F24J 2/542* (2013.01); *H02S 20/00* (2013.01); *F24J 2/4638* (2013.01); *F24J 2002/5462* (2013.01); *F24J 2002/5465* (2013.01); *Y02E 10/47* (2013.01); *Y10T 74/1471* (2015.01)

(56) References Cited

U.S. PATENT DOCUMENTS

| | | |
|---|---|---|
| 2001/0036024 A1 | 11/2001 | Wood |
| 2010/0180883 A1 | 7/2010 | Oosting |
| 2011/0120523 A1 | 5/2011 | Silver |

FOREIGN PATENT DOCUMENTS

| | | |
|---|---|---|
| DE | 102006027152 A1 | 12/2007 |
| FR | 2940524 A3 | 6/2010 |
| FR | 2976056 B1 | 12/2012 |
| FR | 2976057 A1 | 12/2012 |
| WO | 2009147454 A2 | 12/2009 |
| WO | 2010054831 A2 | 5/2010 |
| WO | 2010059218 A2 | 5/2010 |
| WO | 2010089435 A1 | 8/2010 |

OTHER PUBLICATIONS

International Search Report issued Oct. 22, 2012 re: PCT/FR2012/051208; citing: DE 10 2006 027152 A1; US 2011/120523 A1; FR 2 940 524 A3; U.S. Pat. No. 4,209,231 A.

* cited by examiner

MOTORIZED ROTATIONAL DRIVE SYSTEM FOR A SOLAR COLLECTOR TRACKER SUPPORT SYSTEM

TECHNICAL FIELD

The present invention relates to a solar collector tracker support system. It more particularly relates to a tracker system that can be oriented along two axes of rotation, a horizontal axis of rotation for a rotation making it possible to track the sun as it rises and lowers, and a vertical axis of rotation for a rotation making it possible to track the sun from East to West, respectively.

BACKGROUND

The subject-matter of the invention falls within the field of tracker support systems, also called solar trackers, with two axes, in other words that can be oriented in terms of azimuth and elevation.

The invention is applicable in solar trackers with two axes supporting solar collectors, in particular of the following types:
- photovoltaic solar panel integrating photovoltaic cells converting the solar radiation into electricity;
- concentration photovoltaic solar panel integrating optical systems for concentrating the solar radiation, such as Fresnel lenses, magnifying glass or mirror, making it possible to cause the solar radiation to converge toward photovoltaic cells, for example such as high concentration photovoltaic (HCPV) solar panels or low concentration photovoltaic (LCPV) solar panels;
- solar panels converting solar radiation into heat energy;
- mirror panel reflecting the solar radiation toward a solar receiver, such as a boiler placed at the top of a tower in an all-solar application or such as a Stirling engine in a "Dish Stirling" system with a parabolic mirror panel.

In the field of solar trackers with two axes, it is known, in particular from document WO 2009/147454, to provide a tracker support system comprising a stationary single pillar anchored in the ground and a moving structure including two arms rotated along the vertical axis of rotation using a first motorized gear motor unit positioned at the end of the single pillar. The moving structure also integrates a support platform for the solar collectors that is rotated on the arms along the horizontal axis of rotation using a second motorized gear motor unit.

The rotational driving of the platform along the horizontal axis of rotation requires a horizontal beam fastened on the free ends of the arms and on which, at the center thereof, the second motorized gear motor unit is fastened. This driving also requires a transmission shaft rotatably mounted in bearings fastened on the ends of the horizontal beam, and having ends secured to the platform. The second motorized gear motor unit includes a worm screw in mesh with a crown, said crown being passed through by and coupled with the transmission shaft.

Such a driving system has many drawbacks, including the use of a particularly heavy and bulky horizontal beam which, in addition to increasing the weight of the system, makes the assembly of the system more complex. Furthermore, the system uses direct driving between the transmission shaft and the plate with the major drawback of requiring a particularly high gear motor torque for the second motorized gear motor group.

The state of the art may also be illustrated by the teaching of document WO 2010/059218, which discloses a system for rotating the platform of the solar tracker using a ring gear sector in mesh with a central pinion. This ring gear sector is placed in the middle of the platform, on the vertical axis of rotation, with the drawback of providing a structure that is particularly exposed to risks of torsion of the platform along the horizontal axis of rotation under the effect of an imbalance of the wind on the platform; such torsion is particularly detrimental to the precision of the tracker.

BRIEF SUMMARY

The present invention aims to resolve all or some of the aforementioned drawbacks by proposing a motorized drive system for a solar collector tracker support system that guarantees reduced sag on the platform, and therefore prevents torsion thereof along the horizontal axis of rotation.

Another aim of the invention is to propose a motorized drive system for a tracker support system that makes it possible to lighten the structure of the tracker support system and is quick to assemble, and more specifically that makes it possible to decrease the weight of the plate for a same deflected curve.

To that end, it proposes a motorized rotational drive system for rotating a framework around an axis of rotation for a solar collector tracker support system, said motorized system including:
- two ring gear sectors extending in two planes orthogonal to the axis of rotation, preferably the horizontal axis of rotation, and provided with means of attachment to said framework;
- a transmission shaft supporting, in particular on both of its ends, two drive pinions in mesh with the corresponding ring gear sectors for synchronized rotation of said ring gear sectors; and
- a motorized drive means for driving the rotation of said transmission shaft.

Thus, this motorized system offers a particularly advantageous structure, since it makes it possible to work with a reduced gear motor torque, due to the coupling between the ring gear sectors and the transmission shaft, and to limit the risks of torsion of the second framework by separating the ring gear sectors from each other sufficiently; that possible separation between the two ring gear sectors makes it possible to optimize the deflected curves on the framework.

Advantageously, the ring gear sectors extend over an angular sector comprised between 90 and 180°, preferably greater than 120°, to offer a high rotational travel to the framework.

The invention also relates to a solar collector tracker support system that can be oriented along a horizontal axis of rotation and a vertical axis of rotation, and comprising a stationary structure for anchoring to the ground and a moving structure including:
- a first framework rotatably mounted on the stationary structure along the vertical axis of rotation, preferably with a motorized drive system for driving the rotation of said first framework along the vertical axis of rotation; and
- a second framework defining a support platform for the solar collectors and rotatably mounted on the first framework along the horizontal axis of rotation, with a motorized drive system for rotating said second framework along the horizontal axis of rotation;

where said motorized system is according to the invention with:
- the two ring gear sectors extending in two planes orthogonal to the horizontal axis of rotation are fastened on the second framework and are rotatably mounted on the first framework around the horizontal axis of rotation;

the transmission shaft is rotatably mounted on the first framework; and the motor means are fastened on the first framework.

In one advantageous configuration of the invention, the first framework includes at least two arms secured to each other and extending on either side of the vertical axis of rotation to form a V-shaped structure.

This V-shaped structure makes it possible to separate the ring gear sectors and thereby optimize the deflected curves on the second framework. In other words, with such a V-shaped structure, it is advantageously possible to decrease the bending on the second framework and thereby lighten the weight of the tracker system.

According to one feature, the first framework includes two platens fastened on the respective free ends of the two arms and each having a first bearing and a second bearing in which the transmission shaft and the corresponding ring gear sector are respectively rotatably mounted.

Thus, the transmission shaft is rotatably mounted in the first bearings of the platens and the ring gear sectors are rotatably mounted in the second bearings of the corresponding platens; these platens guarantee the structural cohesion and mechanical strength of the assembly to limit the risks of torsion of the second framework.

According to another feature, the free ends of the transmission shaft protrude past the platens to support the drive pinions coupled with the respective ring gear sectors.

In one particular embodiment, the platform of the second framework comprises at least two sidepieces substantially parallel to the horizontal axis of rotation, and the ring gear sectors are fastened on crosspieces fastened on the sidepieces of the platform and extending between at least two sidepieces.

Advantageously, to avoid torsion of the platform, the platform has a predetermined length LO along the horizontal axis of rotation, and the separation between the two ring gear sectors along the horizontal axis of rotation is comprised between LO/5 and 4LO/5, and preferably between 2LO/5 and 3LO/5.

The invention also relates to a solar assembly including a tracker support system according to the invention, and solar collectors supported by the second framework of the tracker support system.

BRIEF DESCRIPTION OF THE DRAWINGS

Other features and advantages of the present invention will appear upon reading the following detailed description of two examples of non-limiting embodiments, done in reference to the appended figures, in which.

DETAILED DESCRIPTION

The following detailed description is done in reference to FIGS. 1 to 9, and pertains to a first tracker support system 1 according to the invention (FIGS. 1 to 6) and a second tracker support system 1 according to the invention (FIGS. 7 to 9), these tracker support systems 1 being of the type that can be oriented along two axes of rotation, a vertical axis of rotation AV and a horizontal axis of rotation AH, respectively. The same numerical references will be used to describe the same members and functional and structural elements of the two tracker support systems 1.

Each tracker support system 1 comprises a stationary structure 2 for anchoring to the ground.

For the first tracker support system 1, the stationary structure 2 is made up of a pylon formed by an assembly of metal profiles and having feet topped by a mast. In the second tracker support system 1, the stationary structure 2 is made up of a pedestal or base made in the form of a ring gear with outer teeth. It is also possible to consider providing a stationary structure made in the form of a pylon or a tubular mast.

This tracker support system 1 also comprises anchoring members 9 for anchoring the stationary structure 2 in the ground. These anchoring members 9 are of the screw, pile, rod or peg type, and are thus designed to penetrate the ground and ensure anchoring of the tracker support system 1. It is also possible to consider providing for anchoring using concrete studs that ballast the stationary structure 2.

This tracker support system 1 further comprises a moving structure 3 rotatably mounted on the stationary structure 2 and comprising a first framework 4 rotatably mounted on the stationary structure 2 along the vertical axis of rotation AV.

The first framework 4 includes two arms 40 that are symmetrical relative to the vertical axis of rotation AV, for example formed by an assembly of metal profiles; these two arms 40 are secured to each other moving away from the vertical axis of rotation AV to form a V-shaped structure.

To ensure the rotation of the first framework 4 around the vertical axis of rotation AV, the tracker support system 1 comprises a first motorized system. Reference may be made to French patent applications no. 11/011659 and no. 11/62002, filed by the Applicant, for additional information on such a first motorized system.

This moving structure 3 also comprises a second framework 5 forming a platform designed to support the solar collectors (not shown) rotatably mounted on the two arms 40 along the horizontal axis of rotation AH.

This platform 5 comprises:

two sidepieces 50 parallel to the horizontal axis of rotation AH, extending symmetrically on either side of the vertical axis of rotation AV, positioned one above the other, and rotatably mounted on the arms 40 of the first framework 4; and several beams 51 extending between the sidepieces 50, fastened on the sidepieces 50, protruding on either side of the sidepieces 50 and designed to support the solar collectors.

Figure 1:
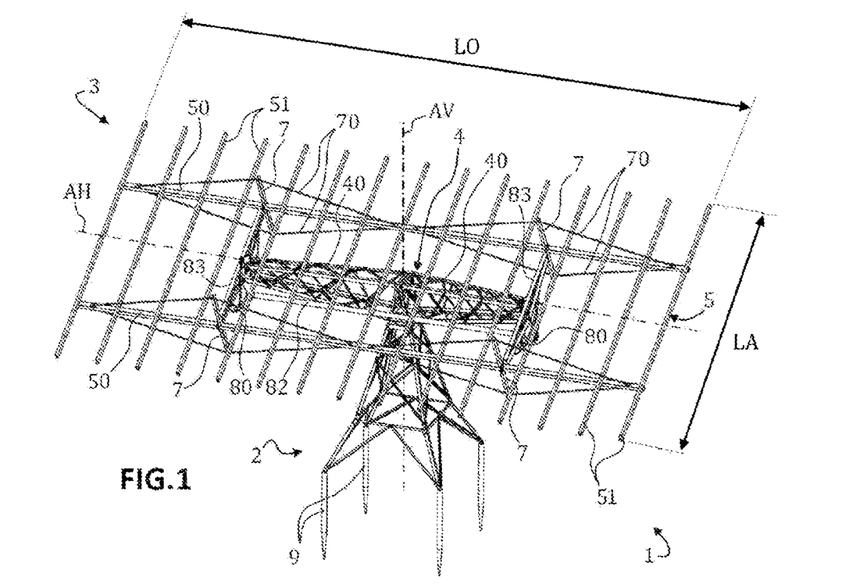
FIG. 1 is a diagrammatic perspective front view of a first tracker support system according to the invention, with the platform inclined relative to the vertical axis of rotation.
Figure 2:
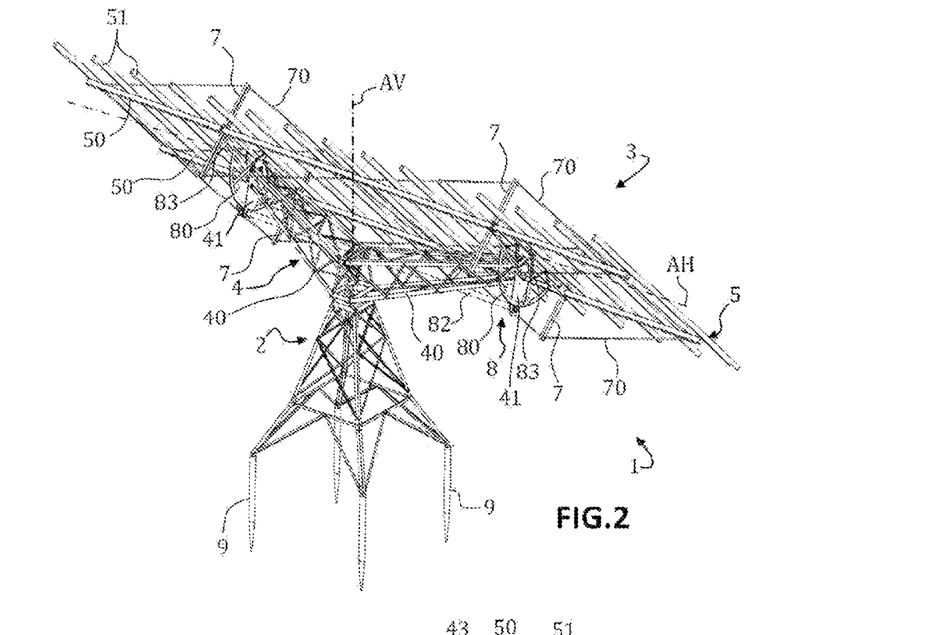
FIG. 2 is a diagrammatic perspective back view of the first tracker support system of FIG. 1.
Figure 3:
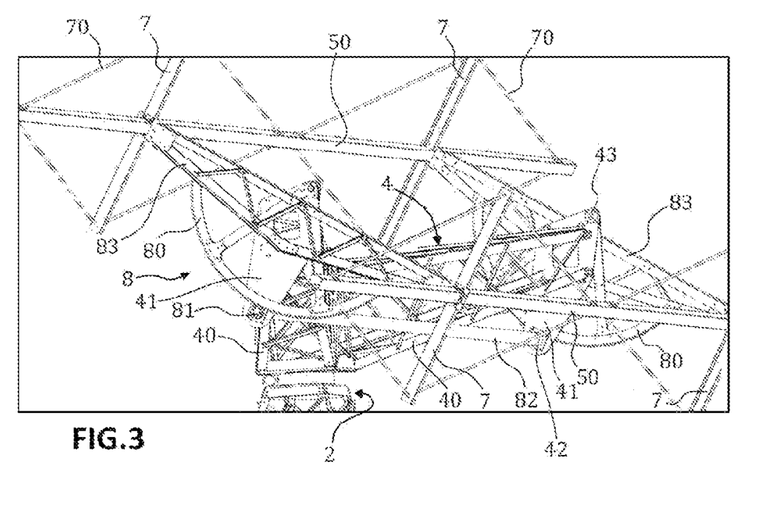
FIG. 3 is an enlarged diagrammatic view of part of the first tracker support system of FIGS. 1 and 2.
Figure 4:
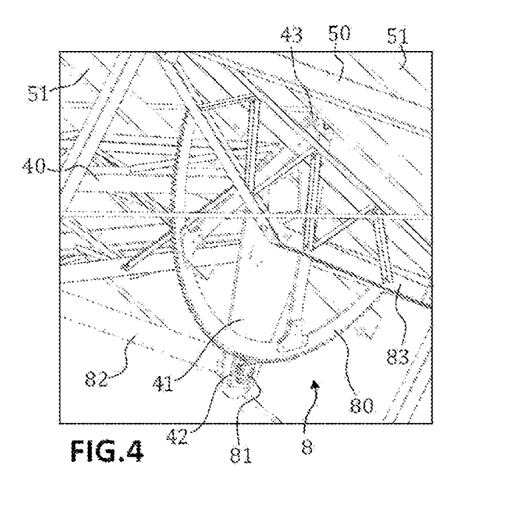
FIG. 4 is an enlarged diagrammatic view of another part of the first tracker support system of FIGS. 1 and 2.
Figures 5, 6:
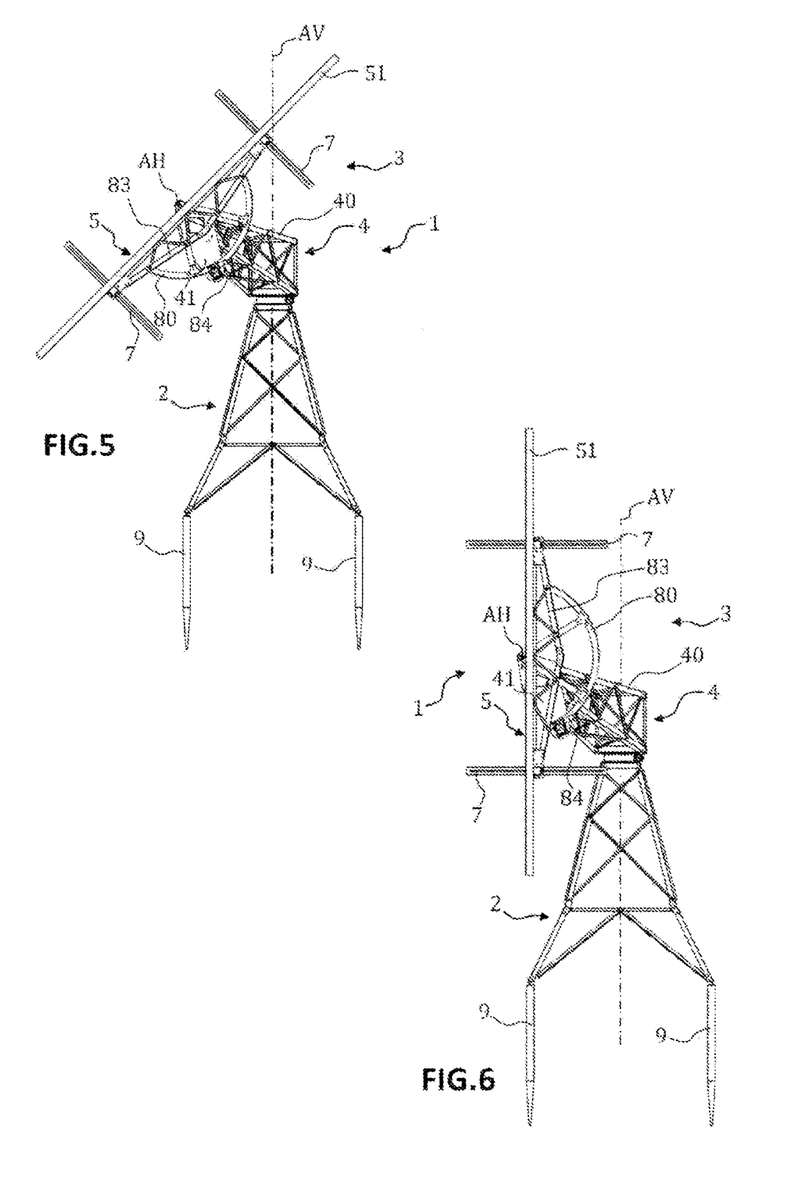
FIG. 5 is a diagrammatic side view of the first tracker support system of FIGS. 1 and 2, with the platform inclined relative to the vertical axis of rotation by a non-zero angle.
FIG. 6 is a diagrammatic side view of the first tracker support system of FIGS. 1 and 2, with the platform parallel to the vertical axis of rotation.
Figure 7:
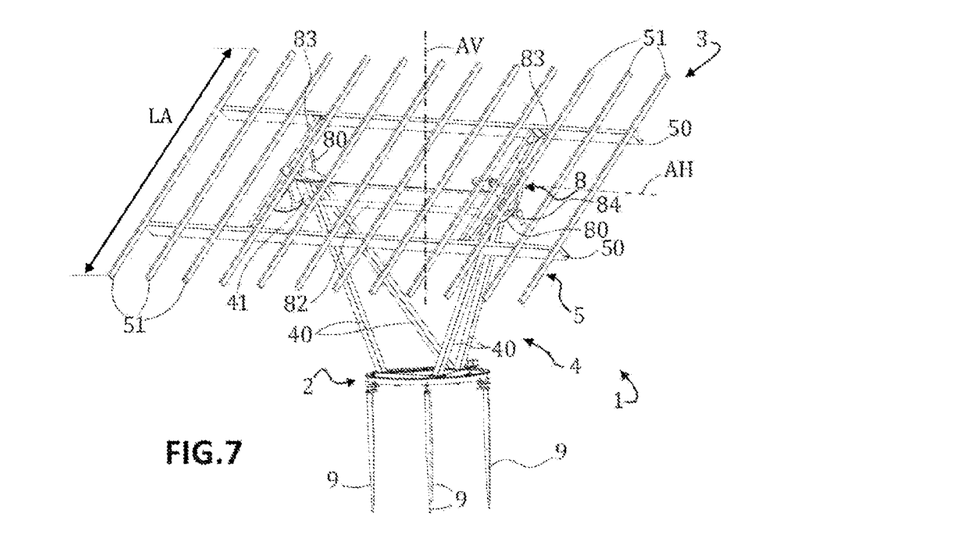
FIG. 7 is a diagrammatic perspective front view of a second tracker support system according to the invention.
Figure 8:
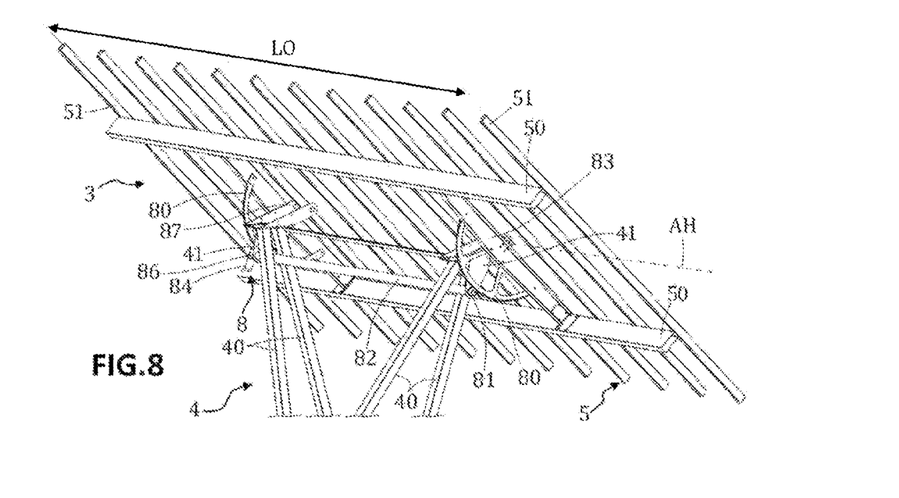
FIG. 8 is a diagrammatic side view of the second tracker support system of FIG. 7.
Figure 9:
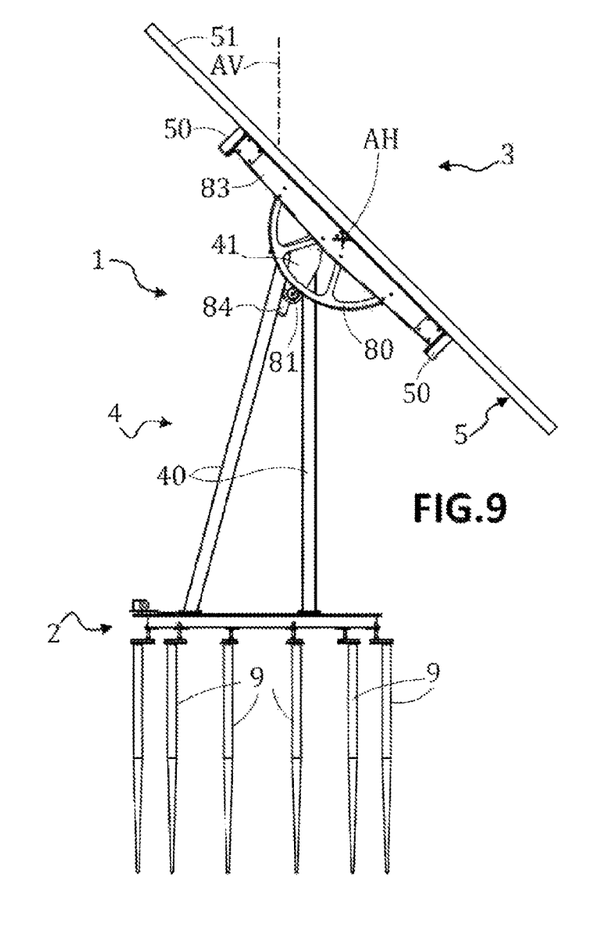
FIG. 9 is a partial perspective diagrammatic back view of the second tracker support system of FIGS. 7 and 8.

It is also possible to consider providing a platform without beams 51, only having several sidepieces 50 side by side. It will be noted that the platform 5 has a length LO along the horizontal axis of rotation AH, corresponding to the length of the sidepieces 50, and also a width LA following a direction orthogonal to the horizontal axis of rotation AH, corresponding to the length of the beams 51, as illustrated in FIG. 2 and in FIGS. 7 and 8 for the first and second tracker support systems, respectively.

For the first tracker support system 1, the platform 5 also includes several guy ropes 7 fastened on sidepieces 50 and extending orthogonally to the platform 5; the ends of the guy ropes 7 are connected to the corresponding sidepieces 50 using connectors 70, in particular of the tensioned rope, rigid rod or metal profile type.

To rotate the platform 5 around the horizontal axis of rotation AH, the tracker support system 1 comprises a motorized drive system 8, including:

- two ring gear sectors 80 positioned on either side of the vertical axis of rotation AV and extending in two planes orthogonal to the horizontal axis of rotation AH, said ring gear sectors 80 being pivotably mounted on the arms 40 of the first framework 4 around the horizontal axis of rotation AH, where the ring gear sectors 80 extend over a same angular sector comprised between 120° and 150°;
- two drive pinions 81 positioned on either side of the vertical axis of rotation and in mesh with the corresponding ring gear sectors 80;
- a transmission shaft 82 rotatably mounted on the first framework 4 and having free ends on which the two drive pinions 81 are securely mounted for synchronized rotation of those drive pinions 81; and
- a rotary engine 84 rotating the transmission shaft 82, said rotary engine 84 being mounted inside a casing fastened on the first framework 4; and
- two crosspieces 83 secured to respective ring gear sectors 80, said crosspieces 83 being fastened on the sidepieces 50 of the platform 5 and having two opposite ends fastened on the two respective sidepieces 50, such that said ring gear sectors 80 are fastened on the platform 5 using said crosspieces 83.

More specifically, the transmission shaft 82 supports the two drive pinions 81 on both of its ends, said drive pinions thus being secured to the transmission shaft.

Furthermore, the first framework 4 includes two platens 41 fastened on the respective free ends of the two arms 40 and extending substantially parallel to the ring gear sectors 80. Each platen 41 has two bearings, i.e.:

- a first bearing 42 in which the transmission shaft 82 is rotatably mounted, having specified that the free ends of the transmission shaft 82 supporting the pinions 81 protrude outwardly (opposite the vertical rotation AV) of the corresponding platens 41; and
- a second bearing 43 in which the corresponding ring gear sector 80 is rotatably mounted, such that the two bearings 43 define the horizontal axis of rotation AH.

Thus, the rotation of the transmission shaft 82 leads to a synchronized rotation of the two drive pinions 81, which rotate the ring gear sectors 80 and the associated crosspieces 83, still in a synchronized manner, so as ultimately to pivot the platform 5 around the horizontal axis of rotation AH.

To limit the risks of torsion of the platform 5, it is advantageous for the separation between the two ring gear sectors 80, along the horizontal axis of rotation AH, to be comprised between LO/5 and 4LO/5, and more particularly between 2LO/5 and 3LO/5, where LO corresponds, as a reminder, to the length of the platform 5 (or length of the sidepieces 50). It should be noted that the separation between the two ring gear sectors 80 corresponds substantially to the length of the transmission shaft 82.

Of course, the example embodiment described above is in no way limiting, and other improvements and details may be made to the tracker support system according to the invention, without going beyond the scope of the invention, where other types of assembly of the frameworks may for example be used.

The invention claimed is:

1. A solar assembly including a tracker support system that can be oriented along a horizontal axis of rotation and a vertical axis of rotation, and comprising a stationary structure for anchoring to the ground and a moving structure including:
   - a first framework rotatably mounted ono the stationary structure along the vertical axis of a rotation; and
   - a second framework defining a support platform for the solar collectors and rotatably mounted on the first framework along the horizontal axis of rotation, with a motorized drive system fo rotating said second framework along this horizontal axis of rotation,
   - and wherein said solar assembly also includes solar collectors supported by the platform of the second framework of the tracker support system;
   - and wherein said tracker support system comprises a motorized rotational drive system for rotating the second framework around the horizontal axis of rotation, said motorized rotational drive system including:
   - two ring gear sectors extending in two planes orthogonal to the horizontal axis of rotation, and the two ring gear sectors are fastened on the second framework and are rotatably mounted on the first framework around the horizontal axis of rotation;
   - a transmission shaft supporting two drive pinions in mesh with the corresponding ring gear sectors for synchronized rotation of said ring gear sectors, wherein said transmission shaft is rotatably mounted on the first framework; and
   - an engine for driving the rotation of said transmission shaft, wherein said engine is fastened on the first framework.

2. A solar assembly according to claim 1, wherein the ring gear sectors extend over an angular sector comprised between 90 and 180 degrees.

3. A solar assembly according to claim 1, wherein the platform of the second framework has a predetermined length LO along the horizontal axis of rotation, and separation between the two ring gear sectors along this horizontal axis of rotation is comprised between LO/5 and 4LO/5.

4. A solar assembly according to claim 1, wherein the first framework includes at least two arms secured to each other and extending on either side of the vertical axis of rotation to form a V-shaped structure.

5. A solar assembly according to claim 4, wherein the first framework includes two platens fastened on the respective free ends of the two arms and each having a first bearing and a second bearing in which the transmission shaft and the corresponding ring gear sector are respectively rotatably mounted.

6. A solar assembly according to claim 5, wherein the free ends of the transmission shaft protrude past the platens to support the drive pinions coupled with the respective ring gear sectors.

7. A solar assembly according to claim 1, wherein the platform of the second framework comprises at least two sidepieces substantially parallel to the horizontal axis of rotation, and wherein the ring gear sectors are fastened on crosspieces fastened on the sidepieces of the platform and extending between at least two sidepieces.

8. A solar assembly according to claim 1, wherein the transmission shaft supports on both of its ends the two drive pinions.

\* \* \* \* \*